(12) United States Patent
Zhu et al.

(10) Patent No.: US 11,214,646 B2
(45) Date of Patent: Jan. 4, 2022

(54) HIGHLY HYDROPHOBIC AND OLEOPHILIC MELAMINE RESIN VIA METAL-ION INDUCED WETTABILITY TRANSITION, APPLICATION, AND PREPARATION THEREOF

(71) Applicant: South Dakota Board of Regents, Pierre, SD (US)

(72) Inventors: Zhengtao Zhu, Rapid City, SD (US); Yichun Ding, Rapid City, SD (US); Daniel Heglund, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 0 days.

(21) Appl. No.: 16/277,437

(22) Filed: Feb. 15, 2019

(65) Prior Publication Data

US 2019/0256638 A1 Aug. 22, 2019

Related U.S. Application Data

(60) Provisional application No. 62/710,434, filed on Feb. 16, 2018.

(51) Int. Cl.

| | |
|---|---|
| *C08G 12/32* | (2006.01) |
| *C08J 3/24* | (2006.01) |
| *C08K 3/16* | (2006.01) |
| *C08K 3/28* | (2006.01) |
| *C08J 9/28* | (2006.01) |
| *C08J 9/00* | (2006.01) |
| *B01J 20/26* | (2006.01) |
| *C08J 9/40* | (2006.01) |
| *C09K 3/32* | (2006.01) |

(52) U.S. Cl.
CPC ............ *C08G 12/32* (2013.01); *B01J 20/265* (2013.01); *C08J 3/246* (2013.01); *C08J 9/0066* (2013.01); *C08J 9/28* (2013.01); *C08J 9/40* (2013.01); *C08K 3/16* (2013.01); *C08K 3/28* (2013.01); *C08J 2201/038* (2013.01); *C08J 2361/28* (2013.01); *C08J 2433/08* (2013.01); *C08J 2463/00* (2013.01); *C08J 2467/00* (2013.01); *C09K 3/32* (2013.01)

(58) Field of Classification Search
CPC ... C08G 12/32; C08J 3/246; C08J 9/28; C08J 9/0066; C08J 9/40; C08J 2433/08; C08J 2361/28; C08J 2463/00; C08J 2467/00; C08J 2201/038; C08K 3/16; C08K 3/28; C09K 3/32; B01J 20/265
See application file for complete search history.

(56) References Cited

U.S. PATENT DOCUMENTS

| | | | |
|---|---|---|---|
| 4,519,918 A | 5/1985 | Ericsson et al. | |
| 4,900,774 A | 2/1990 | Mitsuji et al. | |
| 5,436,278 A | 7/1995 | Imashiro et al. | |
| 8,642,503 B1 | 2/2014 | Tai | |
| 8,937,106 B2 | 1/2015 | Steinke et al. | |
| 2006/0194893 A1 | 8/2006 | Prybutok | |
| 2008/0029460 A1 | 2/2008 | Wright et al. | |
| 2013/0264287 A1 | 10/2013 | Zhang et al. | |
| 2015/0367325 A1 | 12/2015 | Chu et al. | |
| 2017/0036190 A1 | 2/2017 | Pham et al. | |
| 2017/0129786 A1 | 5/2017 | Chen et al. | |

FOREIGN PATENT DOCUMENTS

| | | | |
|---|---|---|---|
| CN | 104497346 A | 4/2015 | |
| CN | 105504336 A | 4/2016 | |
| WO | WO 2016/135257 | * | 9/2016 |

OTHER PUBLICATIONS

Ding et al., "One-Step Preparation of Highly Hydrophobic and Oleophilic Melamine Sponges via Metal-Ion-Induced Wettability Transition", ACS Appl. Mater. Interfaces, Jan. 29, 2018, 10, pp. 6652-6660.*
Chen et al., "Continuous Oil-Water Separation Using Polydimethylsiloxane-Functionalized Melamine Sponge", I&EC Research, vol. 55, pp. 3596-3602, Mar. 14, 2016.
Chu et al., "Oil/Water Separation with Selective Superantiwetting/ Superwetting Surface Materials", Angew. Chem Int. Ed. vol. 54, pp. 2328-2338, 2015.
Liu et al., "The preparation of superhydrophobic graphene/ melamine composite sponge applied in treatment of oil pollution", J. Porous Mater, 8 pages, Aug. 9, 2015.
Ruan et al., "A Superhydrophobic Sponge with Excellent Absorbency and Flame Retardancy", Angew. Chem. Int. Ed., vol. 53, pp. 5556-5560, 2014.
Su et al., "A magnetic superhydrophilic/oleophobic sponge for continuous oil-water separation", Chemical Engineering Journal, vol. 309, pp. 366-373, Oct. 18, 2016.
Tian et al., "Intrinsically robust hydrophobicity", Nature Materials, vol. 12, pp. 291-292, Apr. 2013.
Wang et al., "Beads-on-String Structured Nanofibers for Smart and Reversible Oil/Water Separation with Outstanding Antifouling Property", Applied Materials & Interfaces, pp. 25612-25620 Sep. 2, 2016.
Wang et al., "Bioinspired Surfaces with Superwettability: New Insight on Theory, Design, and Applications", Chemical Review, vol. 115, pp. 8230-8293, Aug. 5, 2015.

(Continued)

*Primary Examiner* — Patrick D Niland
(74) *Attorney, Agent, or Firm* — McKee, Voorhees & Sease, PLC

(57) ABSTRACT

This disclosure is related to a class of metal-ion induced hydrophobic polymers and method of producing such class of compounds by a one-step solution immersion process. Specifically, a metal-ion Induced hydrophobic polymer or melamine sponge (MII-HMS) is disclosed. Such polymer or sponge is demonstrated to be highly hydrophobic and oleophilic and exhibits excellent oil absorption capabilities, being able to absorb a wide range of oils and organic solvents up to 71 to 157 times of its own weight.

18 Claims, 11 Drawing Sheets

(56) References Cited

OTHER PUBLICATIONS

Xue et al., "Special wettable materials for oil/water separation", J Mater. Chem. A. vol. 2, pp. 2445-2460, 2014.
Zhang et al., "Superhydrophobic melamine sponge with excellent surface selectivity and fire retardancy for oil absorption", J. Mater. Sci., 13 pages, Oct. 7, 2016.

* cited by examiner

//highly hydrophobic and oleophilic melamine resin via metal-ion induced wettability transition, application, and preparation thereof

CROSS REFERENCE TO RELATED APPLICATION

This application claims priority under 35 U.S.C. § 119 of a provisional application Ser. No. 62/710,434, filed Feb. 16, 2018 which is herein incorporated by reference in its entirety.

FIELD OF THE INVENTION

The present disclosure is related to a class of metal-ion induced hydrophobic polymers and method of producing such class of compounds by a one-step solution immersion process. Specifically, a Metal-Ion Induced Hydrophobic polymer or Melamine Sponge (MII-HMS) is disclosed. Such polymer or sponge is demonstrated to be highly hydrophobic and oleophilic and exhibits excellent oil absorption capabilities, being able to absorb a wide range of oils and organic solvents up to 71 to 157 times of its own weight.

BACKGROUND OF THE INVENTION

Mechanical absorption by porous materials is considered to be the most effective and economical method for removal of harmful oil, organic chemical, or other pollutant from accidental spill or for decontamination or cleaning purposes. Development of hydrophobic and oleophilic absorbent materials has attracted wide attentions for such removal, decontamination, cleaning, and various other applications. Since conventional absorbent materials such as natural sawdust, zeolite and wool fibers, and nonwoven polypropylene/polyester fabrics typically have the drawbacks of low absorption capacities, poor selectivity, and poor recyclability. Thus, new hydrophobic and oleophilic absorbent materials are needed.

In order to separate oil from water medium, the absorbent materials should be hydrophobic (water contact angle >90°) and oleophilic. The wettability of a solid surface is determined by its chemical composition and the surface roughness. Lowering surface energy and increasing surface roughness are two common strategies for the preparation of hydrophobic surfaces. For example, by coating a hydrophilic surface with perfluorosilanes, the surface can become hydrophobic. Another example of an attempt to lower the wettability of a surface has been by introducing surface roughness using methods such as deposition of nanoparticles, surface etching, and electrospinning, which make a hydrophobic material superhydrophobic (water contact angle >150°).

Despite significant progress in preparation of hydrophobic and oleophilic materials in recent years, application of hydrophobic materials as oil absorbents has been limited due to complicated manufacturing processes, high cost, and the difficulty to scale up for commercialization.

Accordingly, it is an objective of the disclosure to provide a class of metal-ion induced hydrophobic polymers and method of producing such class of compounds by a one-step solution immersion process.

It is another objective of the present disclosure to provide a Metal-Ion Induced Hydrophobic Melamine Sponge (MII-HMS) prepared by a one-step solution immersion process. It is also the objective of the present disclosure to provide a simple, scalable, and economical approach to fabricate highly efficient absorbent materials for potential applications in oil (or organic solvents) spill recovery and environmental remediation.

Other objects, advantages and features of the present invention will become apparent from the following specification taken in conjunction with the accompanying examples or drawings.

BRIEF SUMMARY OF THE INVENTION

A preferred embodiment of the invention comprises a metal-ion induced hydrophobic melamine resin produced by a process, the process comprising contacting a melamine resin with a metal ion solution to form a metal-ion induced hydrophobic melamine resin.

Another preferred embodiment of the invention can comprise a metal-ion induced hydrophobic melamine-formaldehyde sponge produced by a process, the process comprising contacting a melamine-formaldehyde sponge with a metal ion solution to form a metal-ion induced hydrophobic melamine resin.

Yet another preferred embodiment of the invention is an article or product comprising the metal-ion induced hydrophobic melamine resin or melamine-formaldehyde sponge disclosed herein.

Still another preferred embodiment of the invention is a method of producing a metal-ion induced hydrophobic melamine resin or melamine-formaldehyde sponge comprising contacting a hydrophilic melamine resin or melamine-formaldehyde sponge with a solution of a metal ion.

The metal-ion induced hydrophobic melamine resin or metal-ion induced hydrophobic melamine-formaldehyde sponge (MII-HMS) disclosed herein can be prepared by a one-step solution immersion process. This simple process renders the transition of the super-hydrophilic melamine sponge to become highly hydrophobic (water contact angle of ~120°). XPS and FTIR measurements suggest that this unprecedented transition is likely due to the formation of metal complexes during immersion. The metal-ion induced hydrophobic melamine resin or MII-HMS is also oleophilic, exhibiting excellent oil absorption capabilities and being able to absorb ~71 to 157 times of its own weight of a wide range of oils and organic solvents.

DETAILED DESCRIPTION OF THE INVENTION

Figure 1:
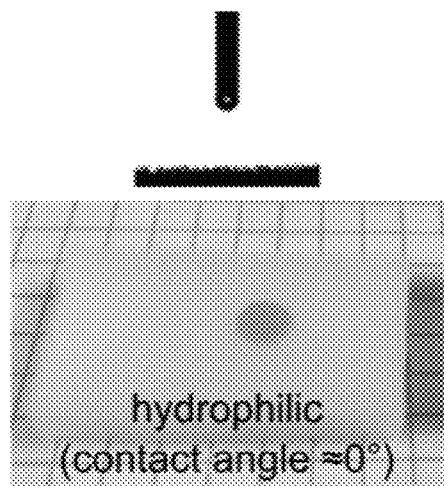
FIG. 1 shows a commercial melamine-formaldehyde sponge and its intrinsic hydrophilic (water contact angle ≈0°) nature.

The present disclosure relates to a metal-ion induced hydrophobic melamine resin, specifically, a metal-ion induced hydrophobic melamine-formaldehyde sponge (MII-HMS), prepared by a one-step solution immersion process. The embodiments of this invention are not limited to any particular device, which can vary and are understood by skilled artisans based on the present disclosure herein. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation. The preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, pH, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about carbon, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about carbon, or typically, from 2 to 10 carbon atoms. Alkynyl groups may be substituted or unsubstituted. Alkynyl groups may be substituted similarly to alkyl or alkenyl groups.

As used herein, the terms "alkylene", cycloalkylene", alkynylides, and alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

The term "ester" as used herein refers to —$R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —$R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}NR^{33'}R^{34'}$ groups, wherein $R^{32'}$, $R^{33'}$, and $R^{34'}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —$R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —$R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —$R^{37}OR^{38}$ groups. $R^{37}$ is absent, a substituted or unsubstituted alkylene, cycloalkylene, alkenylene, alkynylene, arylene, aralkylene, heterocyclylalkylene, or heterocyclylene group as defined herein. $R^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or article, product, or composition as reaction solvent or carrier solvent. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

PREFERRED EMBODIMENTS OF THE INVENTION

A preferred embodiment of the invention comprises a metal-ion induced hydrophobic melamine resin produced by a process, the process comprising contacting a melamine resin with a metal ion solution to form a metal-ion induced hydrophobic melamine resin.

Another preferred embodiment of the invention can comprise a metal-ion induced hydrophobic melamine-formaldehyde sponge produced by a process, the process comprising contacting a melamine-formaldehyde sponge with a metal ion solution to form a metal-ion induced hydrophobic melamine resin.

Yet another preferred embodiment of the invention is an article or product comprising the metal-ion induced hydrophobic melamine resin or melamine-formaldehyde sponge disclosed herein.

Still another preferred embodiment of the invention is a method of producing a metal-ion induced hydrophobic melamine resin or melamine-formaldehyde sponge comprising contacting a hydrophilic melamine resin or melamine-formaldehyde sponge with a solution of a metal ion.

Metal-Ion Solution

The metal-ion solution used in the process of a preferred embodiment may comprise a rare earth metal ion, a transition metal ion, and/or combinations and derivatives and salts thereof. The metal ions used in the metal-ion solution may be singly charged, doubly charged, triply charged, or in a complex.

Preferably the metal-ion solution comprises an ionic salt. Preferably the ionic salt is water soluble. Preferably, the ionic salt contains a transition metal ion and a hydrophobic counter ion. Preferred ionic salts include metal ion salts. Most preferably the salt is a transition metal ion salt.

Preferred salts include, but are not limited to, simple salts containing ions of Fe, Cr, Mn, Co, Ni, Cu, Zn, ionic surfactants containing ions of Fe, Cr, Mn, Co, Ni, Cu, Zn, and combinations of the same. Preferred counter ions for the ionic salts include but, are not limited to, nitrate, sulfate, phosphate, and/or carbonate, or a halogen such as a chloride, bromide, or iodide, and/or combinations and derivatives.

Suitable metal ions for use include $Fe^{2+}$, $Fe^{3+}$, $Zn^{2+}$, $Ni^{2+}$, and/or $Co^{2+}$ and derivatives and salts thereof. More preferably, the metal solution may comprise $FeCl_2$, $FeCl_3$, $Fe(NO_3)_3$, $Zn(NO_3)_2$, $Co(NO_3)_2$, $Ni(NO_3)_2$, and/or combinations and derivatives and salts thereof.

In a preferred embodiment, the metal-ion solution also comprises an ionic surfactant. The surfactant may be anionic, cationic, or nonionic. Preferred surfactants comprise a transition metal ion. Most preferred metal ions for use in a surfactant include Fe, Cr, Mn, Co, Ni, Cu, Zn, and combinations thereof.

The metal-ion solution may be in an aqueous solution wherein the metal ion is present from about 0.0005 M to about 1.0 M. More preferably, the metal ion is present in an aqueous solution from about 0.0005 to about 0.5 M. Most preferably, the metal ion is present in an aqueous solution from about 0.0005 M to about 0.1 M.

Resin

The compositions and methods employ a resin that will be contacted with a metal ion solution to form a metal-ion induced hydrophobic resin. Preferably the melamine resin is formed from a melamine formaldehyde polymer, a melamine formaldehyde bisulfite copolymer, and may be cross-linked with an aldehyde polymer, an alkyd polymer, an epoxy polymer, an acrylic polymer, a polyester polymer, and blends and combinations thereof. In a preferred embodiment, the melamine resin is also a melamine-formaldehyde foam.

The resin may be formed from a polymer according to the methods described in U.S. Pat. No. 2008/0029460. The compositions and methods herein employ a polymer. The polymer may comprise, for example, an aldehyde condensation polymer produced in a condensation reaction involving an aldehyde. Such aldehyde condensation polymers may include polymers of phenol, resorcinol, urea, and melamine. An aldehyde condensation polymer of phenol comprises the condensation polymer of an aldehyde with a phenol such as phenol-resorcinol, xylenol, cresol, resorcinol and derivatives thereof. An aldehyde condensation polymer of urea or another amine comprises the condensation polymer of an aldehyde with a nitrogen-rich material such as benzoguanamine, dicyandiamide, urea, melamine-urea, melamine, and derivatives thereof. Another type of polymer includes an aldehyde condensation polymer of a ketone, which includes, for example, acetone-formaldehyde, methyl ethyl ketone formaldehyde, methylisobutyl ketone formaldehyde, and derivatives thereof.

The polymer may be thermoplastic or thermosetting. The polymer may be cross-linked with aldehyde, alkyd, epoxy, acrylic, and polyester resins, and blends and combinations of the same.

Preferably the polymer is nitrogen rich. In a preferred embodiment of the invention, the monomer(s) making up the polymer have at least 2 nitrogen atoms, at least 3 nitrogen atoms, at least 4 nitrogen atoms, at least 5 nitrogen atoms, or at least 6 nitrogen atoms. Preferred monomers include amine-based monomers, amines (including, but not limited to monoamines, diamines, triamines, and tetraamines), amides, imines, imides, imidazoles, pyridines, etc. Suitable polymers will be those comprising at least one monomeric unit that is nitrogen rich.

Preferred resins are those formed from urea-aldehyde polymers. Such preferred polymers include, but are not limited to, melamine, melamine-formaldehyde, melamine crosslinked with aldehyde, alkyd, epoxy, acrylic, polyester, and blends and combinations of the same.

Hydrophobicity

In a preferred embodiment the metal-ion induced resin is hydrophobic, highly hydrophobic, or superhydrophobic. The metal-ion induced resin's hydrophobicity preferably demonstrates a water contact angle of from about 90° to about 160°. The metal-ion induced resin may be "hydrophobic," i.e. having a water contact angle >90°. The metal-ion induced resin may be "highly hydrophobic," i.e. having a water contact angle of about 120°. The metal-ion induced resin may also be "super hydrophobic," i.e. having a water contact angle >150°. The hydrophobicity is preferably between about 90° to about 160°, more preferably between about 100° to about 160°, and most preferably between about 90° to about 120°.

Methods of the Invention

The method comprises treating a polymer with a salt solution. The treating step can be performed by immersion, soaking, or applying the salt solution to the polymer by any suitable method. Preferably the polymer is immersed in the salt solution. In a preferred embodiment, the metal-ion induced hydrophobic melamine resin is produced by contacting a hydrophilic melamine resin with a solution of a metal ion. In a preferred embodiment, the resin is further dried.

The contacting of the hydrophilic melamine resin with a solution of a metal ion may last from about 1 second to about 60 minutes, more preferably from about 5 seconds to about 2 minutes. The drying of the produced metal-ion induced hydrophobic melamine resin may occur at a temperature of from about 10° C. to about 110° C., more preferably from about 20° C. to about 100° C. The drying of the produced metal-ion induced hydrophobic melamine resin may also occur at room temperature, i.e. the ambient temperature.

Disclosed herein is a simple, economical, and scalable method for preparation of a hydrophobic resin or hydrophobic sponge for oil and organic solvent removal. The as-prepared hydrophobic resin or MII-HMS exhibits excellent oil absorption capability of absorbing 71 to 157 times of its own weight for a wide variety of oils and organic solvents. Furthermore, it can be used to absorb oils/organic solvents both on the water's surface and underwater.

The potential application of the hydrophobic resin or MII-HMS as a super-absorbent is for removal of various oils and organic solvents from a water medium, given its hydrophobic and oleophilic characteristics and other highly attractive intrinsic physical properties, including high porosity (>99%), light weight ($\rho=10.16\pm0.06$ g/cm$^3$), open-cell structure, and good elasticity.

In summary, disclosed here is a highly hydrophobic and oleophilic hydrophobic resin or melamine sponge (MII-HMS) prepared by one-step immersion of an intrinsically hydrophilic melamine sponge in a salt solution for as little as 2 min. The obtained hydrophobic resin or MII-HMS exhibits excellent oil absorption capacity (up to 157 times of its own weight), and can remove both light and heavy oil on the water surface and underwater, respectively. The preparation process of MII-HMS is simple, fast, economic, environmentally friendly, and readily scalable. The disclosed MII-HMS show great potentials for oil spill recovery and environmental remediation.

All publications, patent applications, issued patents, and other documents referred to in this specification are indicative of the level of ordinary skill in the art to which this invention pertains and are herein incorporated by reference to the same extent as if each individual publication or patent application was specifically and individually indicated as incorporated by reference. Definitions that are contained in text incorporated by reference are excluded to the extent that they contradict definitions in this disclosure.

The present invention is further illustrated by the following examples, which should not be considered as limiting in any way.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The morphologies and structures of the sponges were characterized by Field Emission Scanning Electron Microscopy (FE-SEM, Zeiss Supra 40 VP) operated at an accelerating voltage of 2 kV. The SEM/EDS mapping was conducted using the same microscope operated at an accelerating voltage of 8 kV. Water contact angles were measured by Contact Angle specific surface area analyzer (OCA 15EC, Dataphysics instruments GmbH, Germany) from 2 µL droplets of DI water. Fourier transform infrared spectroscopy (FT-IR, Tensor 27, Bruker, Germany) spectra was used to characterize the chemical structure of the melamine sponges before and after metal ion immersion. X-ray photoelectron spectroscopy (XPS, Thermo escalab 250Xi, USA) was used to analyze the surface elemental information.

Example 1

Preparation of Hydrophobic Melamine Sponge

Melamine sponge (melamine-formaldehyde resin sponge) is purchased from SINOYQX (Sichuan, China) and used as received. Other chemicals are purchased from Sigma-Aldrich Chemical Co. (St. Louis, Mo., USA).

The melamine sponge is a sponge with a highly porous open-cell structure.[5a, 7] It is commonly used as an insulating material for pipes and ductwork, a soundproofing material, and a kitchen cleaning sponge as shown in FIG. 1.

Melamine sponge is intrinsically both hydrophilic and oleophilic with a water contact angle ≈0°, as shown in FIG. 1. Thus, it cannot absorb oil from the aqueous medium. Many studies have reported conversion of melamine sponge from hydrophilic to hydrophobic using strategies of surface modification and roughing. Ruan et al.[5a] prepared a super-hydrophobic melamine sponge by depositing a thin layer of polydopamine, followed by grafting with a low surface energy molecule, 1H,1H,2H,2H-perfluorodecanethiol. Pham et al.[8] and Chen et al.[5b] hydrophobilized melamine sponges using octadecyltrichlorosilane ($CH_3(CH_2)_{17}SiCl_3$) and polydimethylsiloxane (PDMS), respectively. Another strategy is to carbonize the melamine sponge to form a hydrophobic carbon sponge.[7, 9] Nevertheless, all these processes are complicated, time-consuming, and costly.

For the preparation of hydrophobic melamine sponge (MII-HMS), the melamine sponge was first cut into small pieces, and then immersed in a salt solution. In this example, a piece of melamine sponge is immersed in $FeCl_3$ (0.1 M) solution for less than 10 min. After immersion, the absorbed solution in the sponge was squeezed out and further sucked out using towel paper. Thereafter, the sponge was dried in an oven at a setting temperature. With this simple one step process, the melamine sponge becomes a Metal-ion Induced Hydrophobic Melamine Sponge (MII-HMS).

Figure 2:
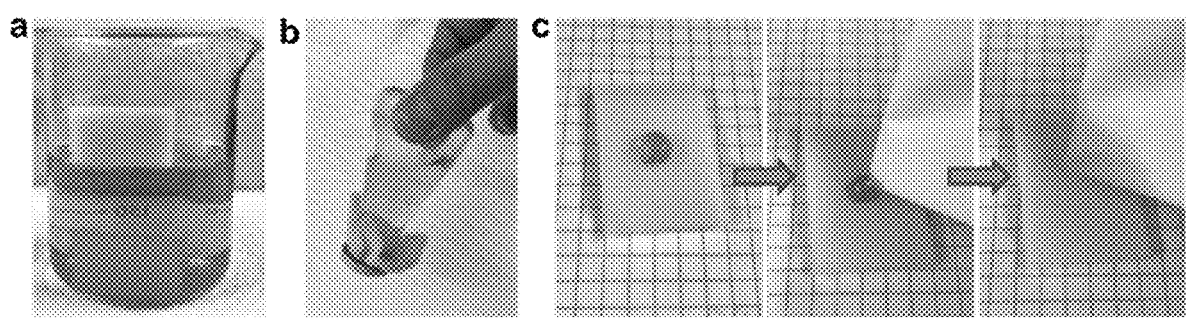
FIG. 2 shows the hydrophobicity of the MII-HMS after being treated by a 0.1 M $FeCl_3$ solution. (a) A MII-HMS sample floats on water while the pristine MS sample sinks in water. (b) The MII-HMS sample is used as a cap sealing a bottle of water. (c) A dyed water droplet on the MII-HMS sample is removed by a piece of tissue paper.
Figure 3:
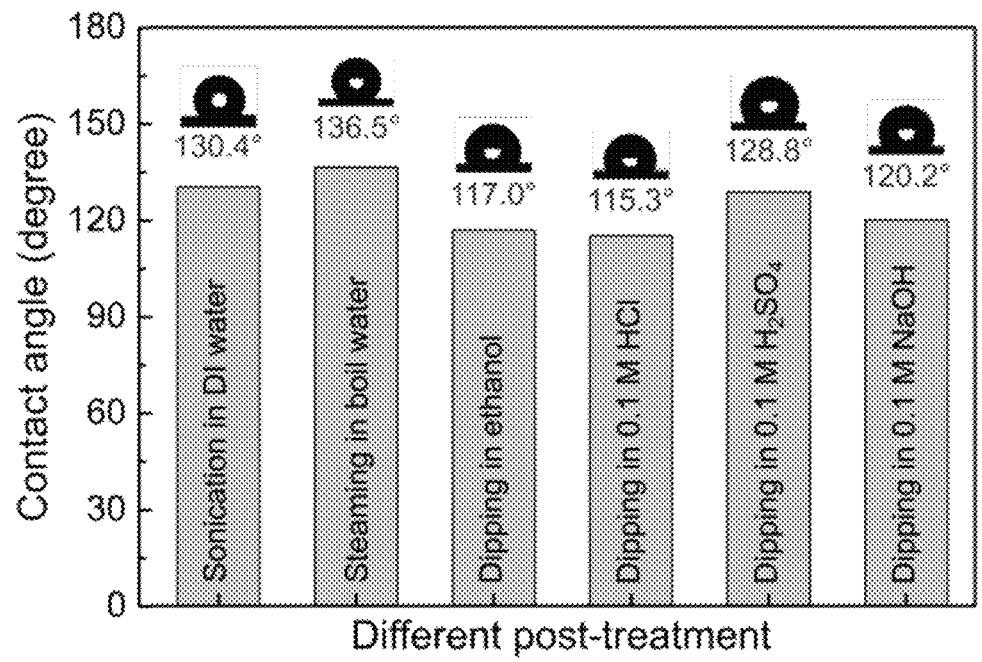
FIG. 3 shows the water contact angles of MII-HMS (treated by a 0.1 M $FeCl_3$ solution) after different post-treatment processes.

As shown in FIG. 2, the water droplets bead up on the surface of the MII-HMS (c), indicating that the melamine sponge becomes hydrophobic. Interestingly, MII-HMS remains oleophilic; the vegetable oil droplets are immediately absorbed into the sponge. The hydrophobic behavior of MII-HMS is further demonstrated by photos in FIG. 2. A piece of MII-HMS floats on the water surface (a), and can be used to seal a bottle of water (b); the water droplet on the surface of the MII-HMS is readily removed by a tissue paper (c). When a monolith of MII-HMS is cut into several small pieces, they remain hydrophobic, indicating that hydrophobilization not only occurs on the surface, which is often the case when modifying films, but also inside the foam, a clear advantage of the highly porous spongy materials. Therefore, the produced MII-HMS can be readily tailored into any shape for different applications. FIG. 3 demonstrate the simplicity of the sample preparation process. In addition, the transition from hydrophilic to hydrophobic melamine sponge is robust, as shown in FIG. 3.

The stability of the prepared MII-HMS was evaluated by different post-treatment, including sonication in DI water, steaming in boil water, dipping in ethanol, and dipping in acid (0.1 M HCl & 0.1 M $H_2SO_4$) and alkali solution (0.1 M NaOH), followed by drying in oven (100° C.). Since the MII-HMS sample was rather hydrophobic, it was immersed in the above hydrophilic solutions rather forcibly. After the above treatment, the MII-HMS samples were forcibly absorbed with water/solution and immersed in the water/solutions. Water contact angles of the sample were measured after drying. The result is shown in FIG. 3.

The results show the MII-HMS sponge remains highly hydrophobic after treatments in different harsh conditions (e.g., sonication, dip in boil water, organic solvent, acid or alkali solutions) followed by drying. This means that the produced sponges can be used for their intended purposes in various harsh conditions.

Example 2

Characterizations of Hydrophobic Melamine Sponge

Figure 4:
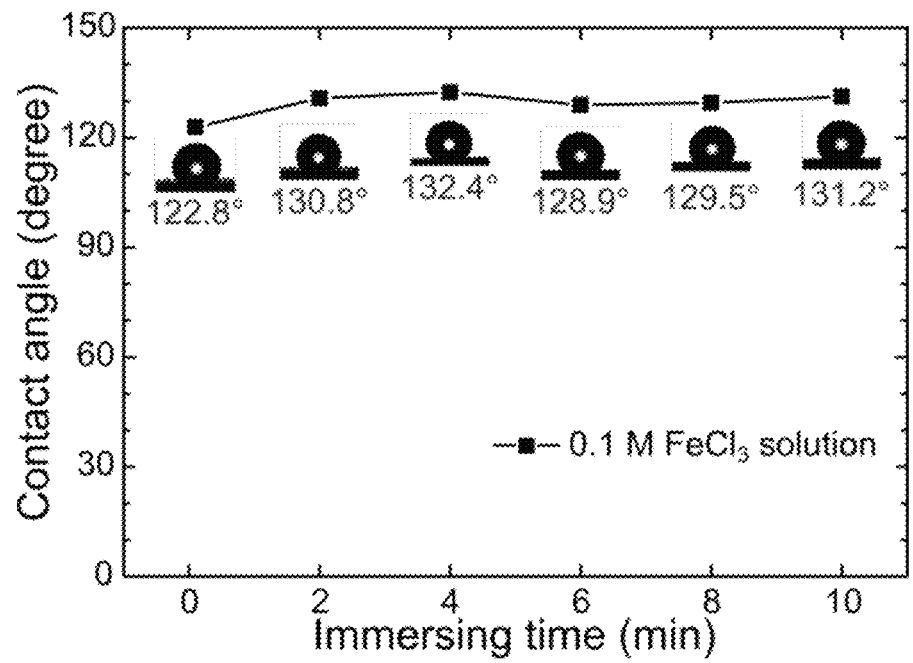
FIG. 4 shows the water contact angles of MII-HMS prepared by immersion in a 0.1 M $FeCl_3$ solution for different duration, followed by drying at 100° C.
Figure 5:
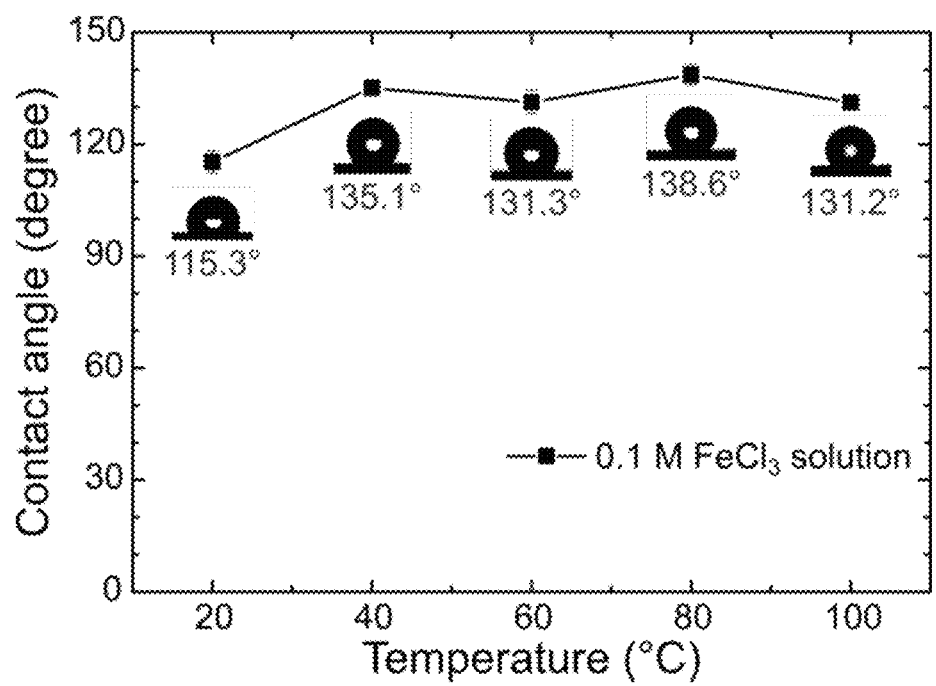
FIG. 5 shows the water contact angles of MII-HMS prepared by immersion in a 0.1 M $FeCl_3$ solution for 10 min, then dried at different temperatures.

FIG. 4 shows the water contact angle of MII-HMS after immersed in 0.1 M $FeCl_3$ solution for different periods followed by drying at 100° C. Within just a few second immersion, MII-HMS becomes hydrophobic with a water contact angle of ~122.8°, which raises to 130° after 2 min and remains there up to 10 min immersion. The effect of drying temperature on the water contact angle of MII-HMS is shown in FIG. 5. When dried above 40° C., the water contact angle of MII-HMS becomes higher than 130°; even when dried at ambient temperature (~20° C.) after immersion in salt solution, MII-HMS becomes hydrophobic with a water contact angle of 115.3°.

Figure 6:
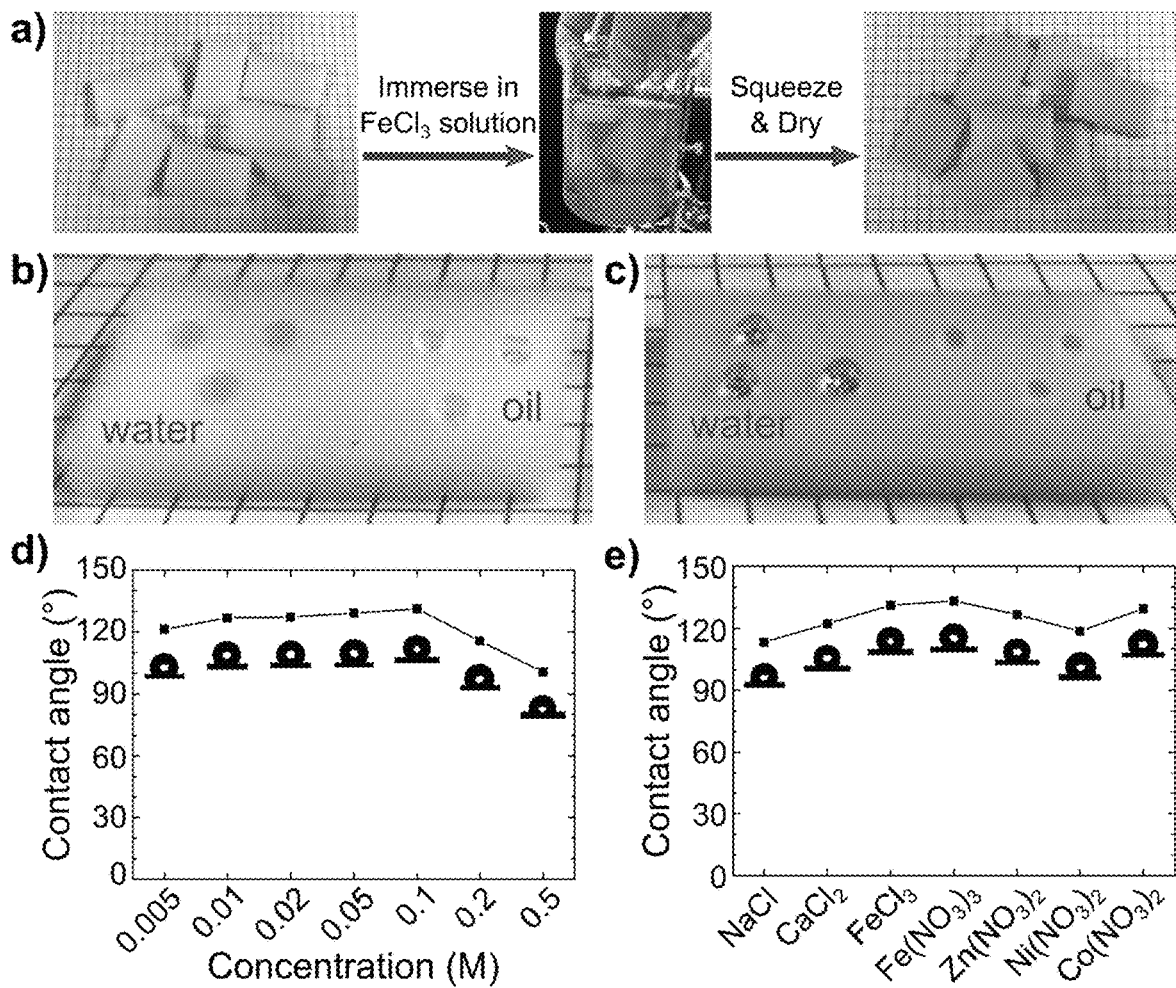
FIG. 6 shows a) preparation of the Metal-ion Induced Hydrophobic Melamine Sponge (MII-HMS) by one-step immersion of the melamine sponge in a salt solution (e.g., FeCl₃) followed by drying. b-c) photographs of water and vegetable oil droplets on b) the pristine melamine sponge and c) the MII-HMS. d) The water contact angle of MII-HMS prepared by immersed in the FeCl₃ solution of different concentrations. e) The water contact angle of MII-HMS prepared by immersed in different salt solutions (0.1 M).

The effect of the $FeCl_3$ concentration is subsequently investigated. As shown in FIG. 6, after treatment by $FeCl_3$ solution with concentrations of 0.005, 0.01, 0.02, 0.05, and 0.1 M, the water contact angle changes from 121.3° to 130.2°. It is quite remarkable that the melamine sponge becomes hydrophobic (water contact angle 121.3°) even when treated by an $FeCl_3$ solution with concentration as low as 0.005 M. The water contact angle of MII-HMS peaks at 130.2° at 0.1 M $FeCl_3$, then decreases at 0.2 M $FeCl_3$ solution.

Figure 7:
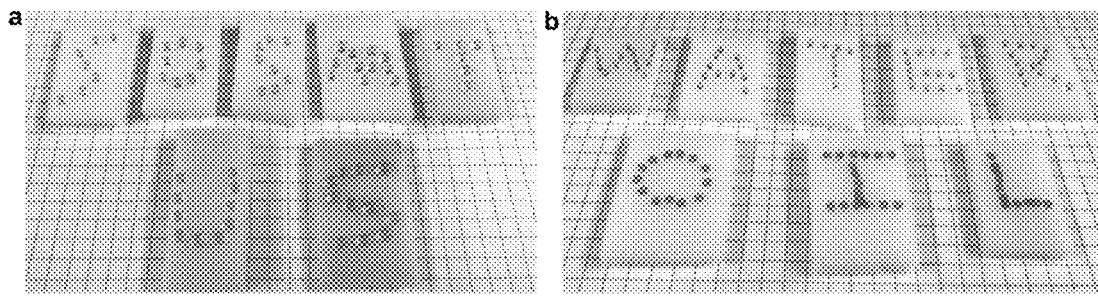
FIG. 7 show photos of MII-HMS prepared from different conditions and water/oil droplets on the surface of sponges showing their hydrophobic and oleophilic characteristics. a) Photos of water droplets beaded up on the surface MII-HMS treated by FeCl₃ solutions of different concentration (0.005, 0.01, 0.02, 0.05, 0.1, 0.2, and 0.5 M, respectively, from left to right). b) Photos of MII-HMS treated by different salt solutions (0.1 M), and the dyed water (top row) and oil (bottom row) droplets on the surface of the sponges showing they are highly hydrophobic and oleophilic.
Figure 8:
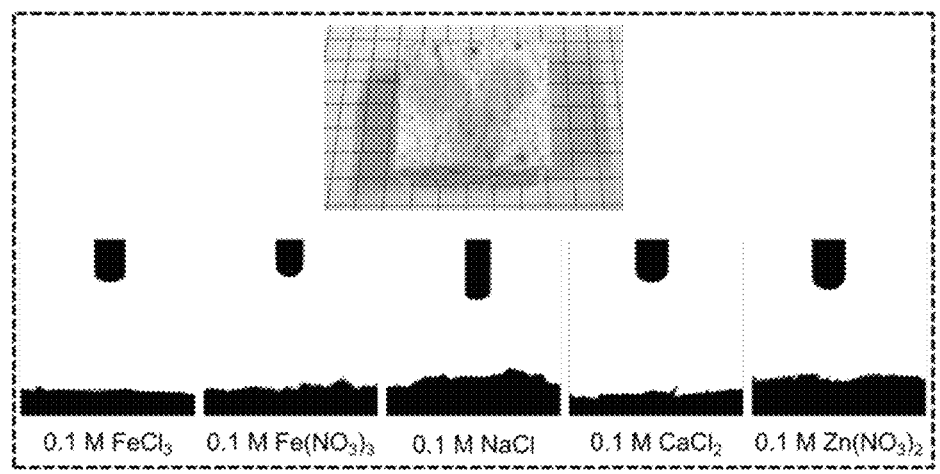
FIG. 8 shows photos of the water contact angles of a cellulose sponge (the control sample) after immersed in different salt solutions (all at 0.1 M) for 10 min and dried at 100° C. for 1 h.

Interestingly, the metal-ion induced hydrophilic to hydrophobic transition of the melamine sponge is not limited to $FeCl_3$ solutions. As shown in FIG. 6 and FIG. 7, this transition is rather universal in various other salt solutions, including $Fe(NO_3)_3$, $Zn(NO_3)_2$, $Ni(NO_3)_2$, and $Co(NO_3)_2$. It is worth noting that the metal-ion induced hydrophilic to hydrophobic transition is unique to melamine sponges. A control experiment shows that no hydrophilic to hydrophobic transition is observed in cellulose sponge when treated with the same salt solutions as shown in FIG. 8.

Example 3

Spectral Characterizations of Hydrophobic Melamine Sponge

Figure 9:
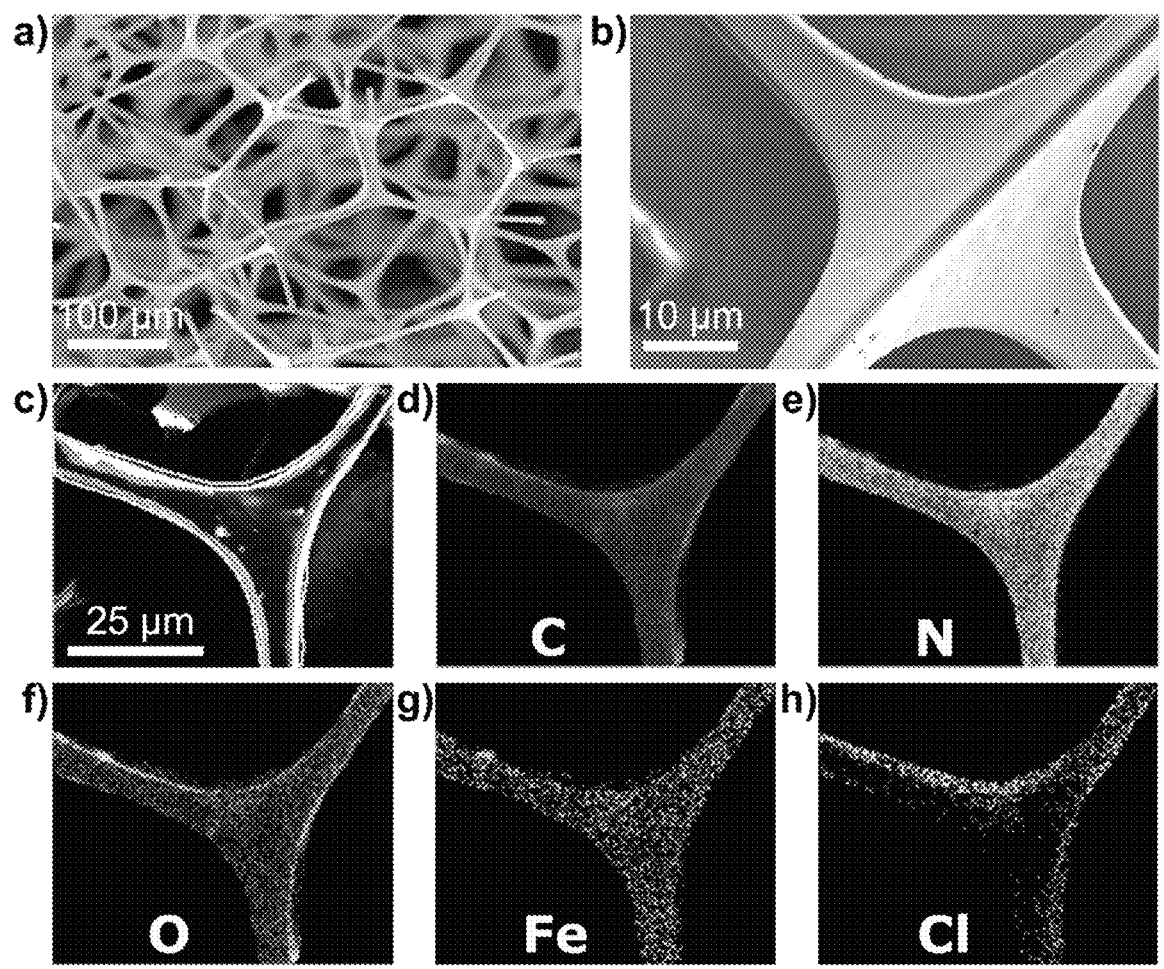
FIG. 9 shows a-b) SEM images of the MII-HMS treated with 0.1 M FeCl₃ solution. c-h) SEM-EDS elemental mapping images acquired from a representative MII-HMS treated with 0.1 M FeCl₃ solution.
Figure 10:
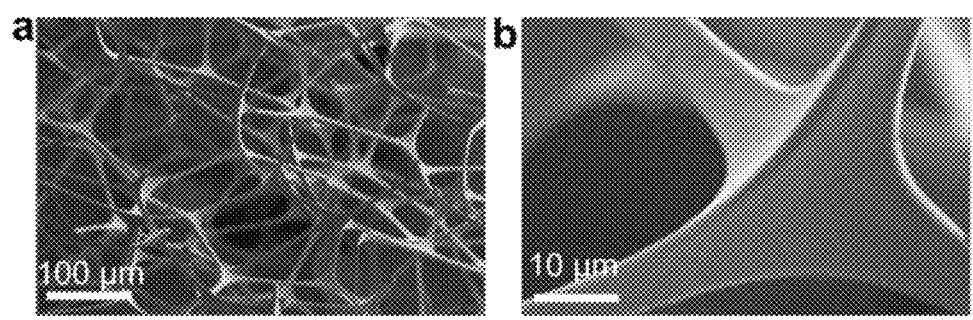
FIG. 10 shows SEM images of the pristine melamine sponge.
Figure 11:
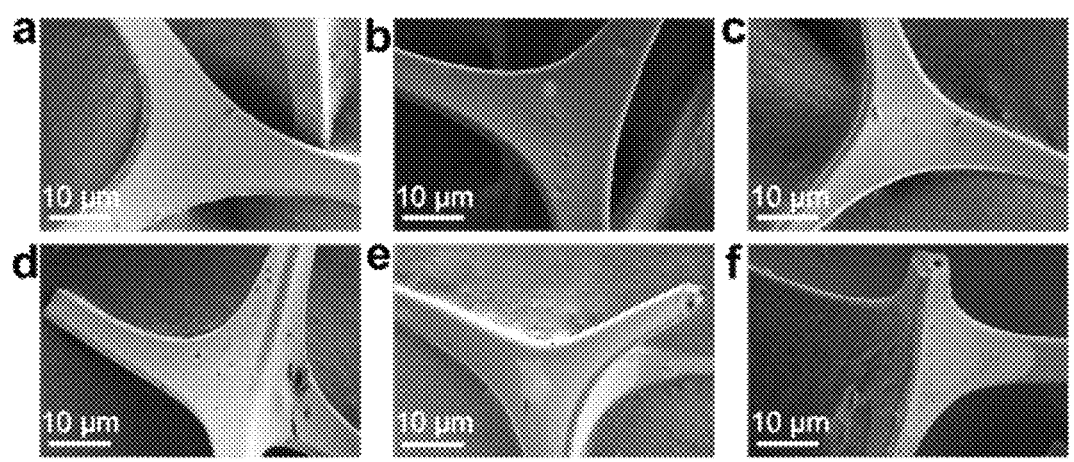
FIG. 11 shows SEM images of MII-HMS prepared from FeCl₃ solutions of different concentrations. a) 0.005 M; b) 0.01 M; c) 0.02 M; d) 0.05 M; e) 0.2 M; f) 0.5 M.

The hydrophilic to hydrophobic transition of melamine sponge is characterized by XPS and FTIR. In FIG. 9, Scanning electron microscopy (SEM) images of MII-HMS treated with 0.1 M $FeCl_3$ solution show that there are no apparent changes of the open cell surface morphology of the MII-HMS in comparison with those of the pristine ones as in FIG. 10. Furthermore, the surface of melamine sponges treated at different $FeCl_3$ concentrations remain rather smooth as shown in FIG. 11, except some degrees of roughening at sporadic locations for samples treated at high $FeCl_3$ concentrations (0.2 and 0.5 M). Therefore, change of surface roughness can be ruled out as the cause of the hydrophilic to hydrophobic transition. The composition of the MII-HMS sample after treatment with 0.1 M $FeCl_3$ solution is mapped by SEM Energy Dispersive Spectroscopy (EDS) analysis shown in FIG. 9 (c-h); C, N, O, Fe, and Cl elements are identified on the surface, confirming that metal ions are incorporated within the melamine sponge.

Figure 12:
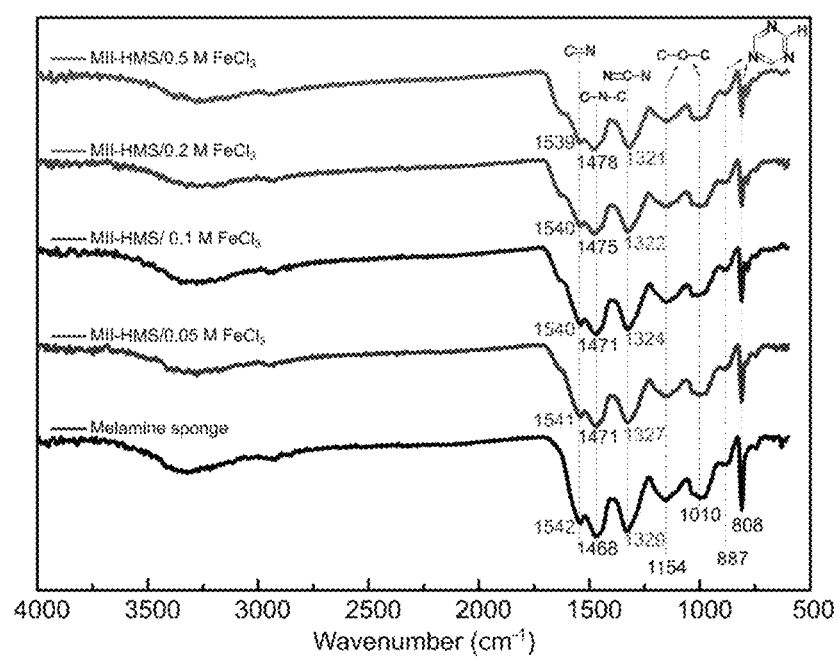
FIG. 12 shows FT-IR spectra of melamine sponge and the MII-HMS samples prepared by immersion in FeCl₃ solutions of different concentrations.

To better understand the nature of the treated MII-HMS and thus the mechanism of the hydrophilic to hydrophobic transition, Fourier transform infrared spectroscopy (FTIR) and X-ray photoelectron spectroscopy (XPS), which analyze the chemical constituents and change of chemical bonds, were used to characterize the foams. FIG. 12 shows the FTIR spectra of the pristine melamine sponge and MII-HMS treated by $FeCl_3$ solutions with different concentrations. The pristine melamine sponge shows the characteristic stretching vibration modes of C=N and C—N on triazine ring at 1542 $cm^{-1}$ (C=N),[6b] and 1329 $cm^{-1}$ (C—N),[10] respectively. For MII-HMS, the vibration modes at 1542 and 1329 $cm^{-1}$ are shifted to lower wavenumbers of 1539~1541 $cm^{-1}$ and 1321~1327 $cm^{-1}$, respectively, suggesting that the triazine N atom forms coordination bonds,[11] presumably with metal ion $Fe^{3+}$. The vibration mode of amino C—NH shifts from 1468 $cm^{-1}$ in the pristine melamine sponges to higher wavenumbers of 1471~1478 $cm^{-1}$ in MII-HMS, supporting the formation of coordination bonds between amino N atom and metal ion.[12]

Figure 13:
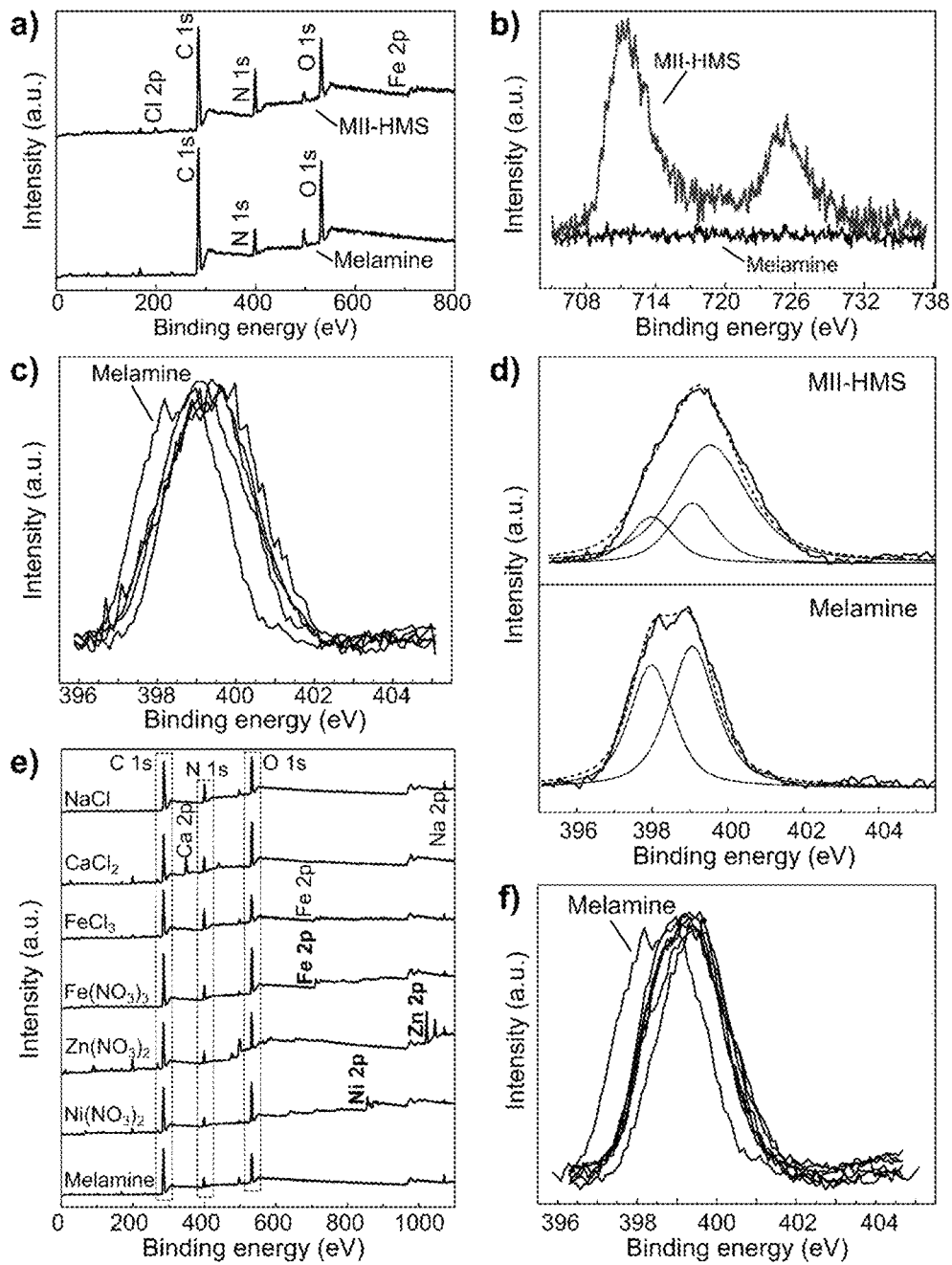
FIG. 13 shows a) XPS spectra of the pristine melamine sponge and MII-HMS treated with 0.1 M FeCl₃ solution. b) XPS spectra of the pristine melamine sponge and MII-HMS treated with 0.1 M FeCl₃ solution in the energy region of Fe 2p. c) XPS N is peak of the pristine melamine sponge and MII-HMS treated with FeCl₃ solutions of different concentration (0.05 M, 0.1 M, 0.2 M, and 0.5 M). d) Fitting of the XPS N is peak of the pristine melamine sponge and MII-HMS treated with 0.1 M FeCl₃ solution. e) XPS spectra of the pristine melamine sponge and MII-HMS treated by different salt solutions (0.1 M). f) XPS N is peak of the pristine melamine sponge and MII-HMS treated by different salt solutions at 0.1 M (NaCl, CaCl₂, FeCl₃, Fe(NO₃)₃, Zn(NO₃)₂, and Ni(NO₃)₂).
Figure 14:
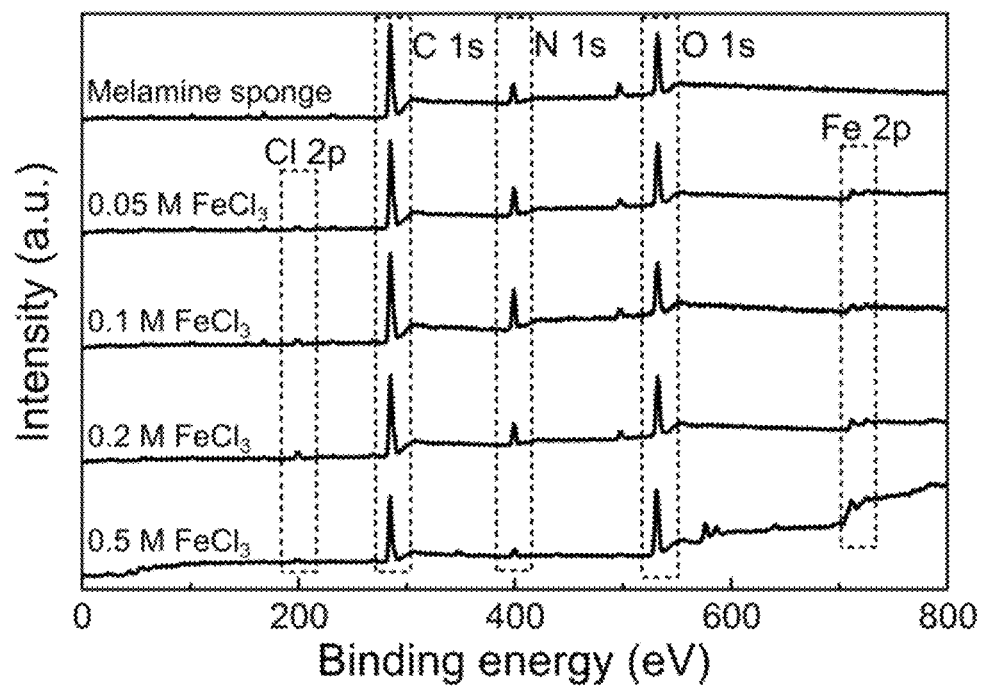
FIG. 14 shows XPS spectra of the pristine melamine sponge and MII-HMS prepared by immersion in FeCl₃ solutions of different concentrations.
Figure 15:
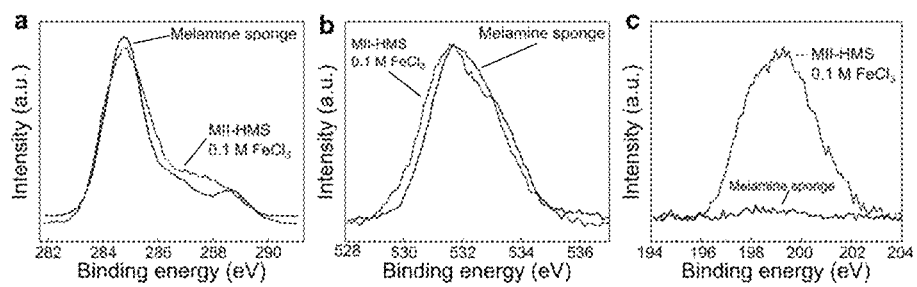
FIG. 15 shows XPS C 1s (a), O 1s (b), and Cl 2p (c) peaks of the pristine melamine sponge and MII-HMS prepared by immersion in a 0.1 M FeCl₃ solution.
Figure 16:
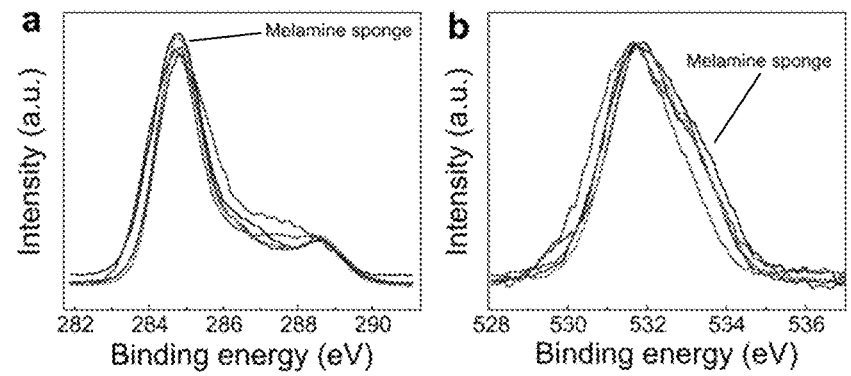
FIG. 16 shows XPS C 1s (a) and O 1s (b) peaks of melamine sponge and MII-HMS prepared by immersion in different salt solutions at 0.1 M (FeCl₃, Fe(NO₃)₃, Zn(NO₃)₂, and Ni(NO₃)₂).

XPS analysis further confirms the interaction between metal ion and melamine sponge. The XPS spectrum of the pristine melamine sponge shows peaks of C, N and O, whereas peaks of Fe and Cl are observed in the spectrum of MII-HMS as shown in FIG. 13, panels a-b and FIG. 14. Compared to the pristine melamine sponge, the C 1s and O 1s peaks of MII-HMS do not change significantly as shown in FIG. 15, panels a-b, but the N 1s peak is shifted significantly to higher binding energy for all the MII-HMS samples treated with $FeCl_3$ solutions of different concentration (0.05 M, 0.1 M, 0.2 M, and 0.5 M) (FIG. 13, panel c). In melamine sponges, there are two types of N atoms: N of the triazine ring (=N—) and N of the amino group (—NH—). As shown in FIG. 13, panel d), the N is peak of the pristine melamine sponge is de-convoluted to two peaks at 397.98 eV and 399.06 eV, assigned to the =N— and —NH— groups, respectively.[13] The N is peak of MII-HMS treated with 0.1 M $FeCl_3$ solution is de-convoluted to three peaks at 397.98 eV, 399.06 eV and 399.53 eV, among which the new peak at 399.53 eV would be attributed to the formation of coordination bonds between N atoms and metal ions.[13b] FIG. 13, panel e) shows the XPS spectra of MII-HMS prepared from other salt solutions (NaCl, $CaCl_2$), $FeCl_3$, $Fe(NO_3)_3$, $Zn(NO_3)_2$, and $Ni(NO_3)_2$). Similar to the observation from $FeCl_3$ treated MII-HMS, peaks of corresponding metal elements are observed from different salt treated MII-HMS samples; the C 1s and O 1s peaks show no changes between the pristine melamine sponge, and the other salt solutions (FIG. 16), while the N is peaks show a significant shift to higher binding energy for all the MII-HMS samples treated by the corresponding salt solutions at 0.1 M (NaCl, CaCl$_2$), FeCl$_3$, Fe(NO$_3$)$_3$, Zn(NO$_3$)$_2$, and Ni(NO$_3$)$_2$) (FIG. 13, panel f). These results clearly indicate the formation of coordination interactions between different metal ions and N atoms in MII-HMS, leading to the hydrophilic to hydrophobic transition.

Figure 17:
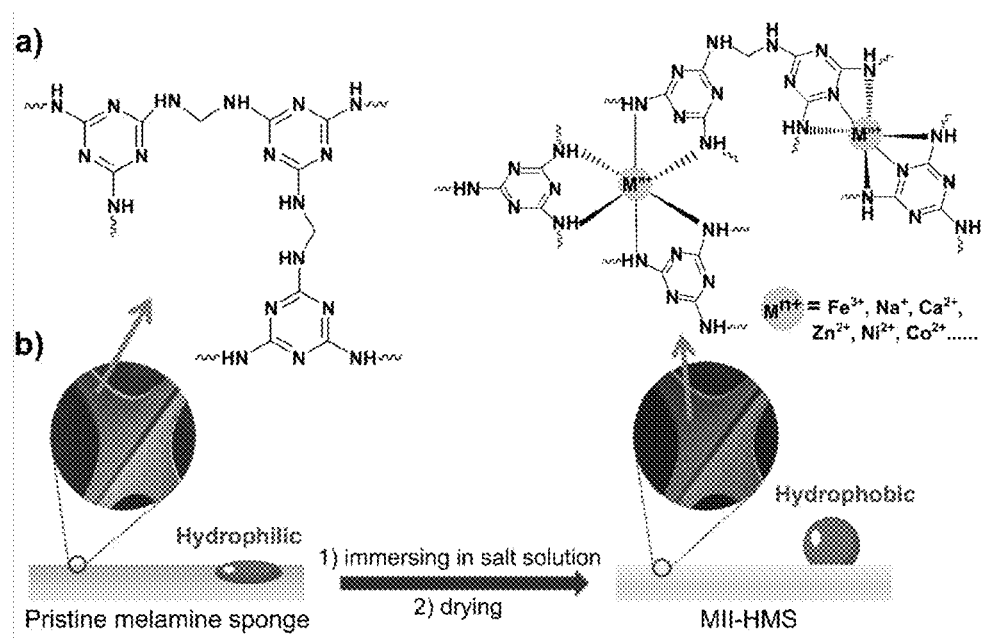
FIG. 17 shows the schematic illustrations of (a) coordination interactions between the metal ions and N atoms in MII-HMS and (b) the corresponding hydrophilic to hydrophobic transition of the melamine sponge.

Based on the results of FTIR and XPS analysis, a mechanism of the metal-ion induced hydrophilic to hydrophobic transition is proposed. FIG. 17, panel a) shows a representative metal ion-N coordination structure, where the Fe$^{3+}$ ion usually forms a six-coordinated complex. It is known that the surface energy is proportional to the polarity of chemical bonds on the surface.[6a] The repeating unit of melamine sponges is a nitrogen-containing benzoheterocyclic skeleton of 2,4,6-triamino-s-triazine, in which the N atoms of the triazine are sp$^2$ hybridized and the N atoms of the amino groups are sp$^3$ hybridized;[14] both types of N atoms have lone-pair electrons. The abundance of lone-pair electrons results in a high polar surface and accordingly makes melamine sponges intrinsically hydrophilic. The lone-pair electrons in melamine can coordinate with other atoms, such as metal ions with empty p or d orbitals or unpaired electrons, to form metal complexes.[11, 13b, 15] Due to the formation of metal complexes, the lone-pair electrons form coordinate-covalent bonds; the nitrogen-metal ion complex, together with the counter ions, may reorganize the chemical structure on the melamine sponge's surface, which reduces the surface polarity of the melamine sponge and makes it hydrophobic,[16] while the high porosity of the sponge amplifies the hydrophobicity (FIG. 17, panel b). In other words, FTIR and XPS suggest that nitrogen atoms of melamine may coordinate with the metal ions, leading to large wettability change, from superhydrophilic to highly hydrophobic sponge.

Example 4

Oil/Organic Solvents Absorption Capacity, Density, Porosity, and Stability Measurement The potential application of the MII-HMS as a superabsorbent is then evaluated for removal of various oils and organic solvents from a water medium, given its hydrophobic and oleophilic characteristics and other highly attractive intrinsic physical properties, including high porosity (>99%), light weight ($\rho$=10.16±0.06 g/cm$^3$), open-cell structure, and good elasticity.

A cubic MII-HMS with the size of 2×2×2 cm$^3$ was used for testing the absorption capacity of the sponge to various oils and organic solvents.

$$\text{absorption capacity (wt./wt.)} = \frac{m_1 - m_0}{m_0}$$

where $m_0$ is the mass of the prepared MII-HMS, $m_1$ is the mass of the MII-HMS fully absorbed with organic solvent/oil. Each experiment tested 5 samples, and the average value was reported here.

A cubic pristine melamine sponge or MII-HMS with the size of 2×2×2 cm$^3$ was used for testing the density ($\rho$) and porosity (P).

$$\rho(\text{mg/cm}^3) = \frac{m_s}{2 \times 2 \times 2}$$

$$P = \left(1 - \frac{\rho}{\rho_{bulk}}\right) \times 100\%$$

where $m_s$ is the mass of the sample, p is the density of the sample, and $\rho_{bulk}$ is the density of bulk melamine resin ($\rho_{bulk}$=1.51 g/cm$^3$) Each experiment tested 5 samples, and the average value was reported here. The measured density of pristine melamine sponge is 9.87±0.1 g/cm$^3$, and the measured density of MII-HMS (treated by 0.1 M FeCl$_3$ solution) is 10.16±0.06 g/cm$^3$; the measured porosity of MII-HMS (treated by 0.1 M FeCl$_3$ solution) is about 99.3%.

Figure 18:
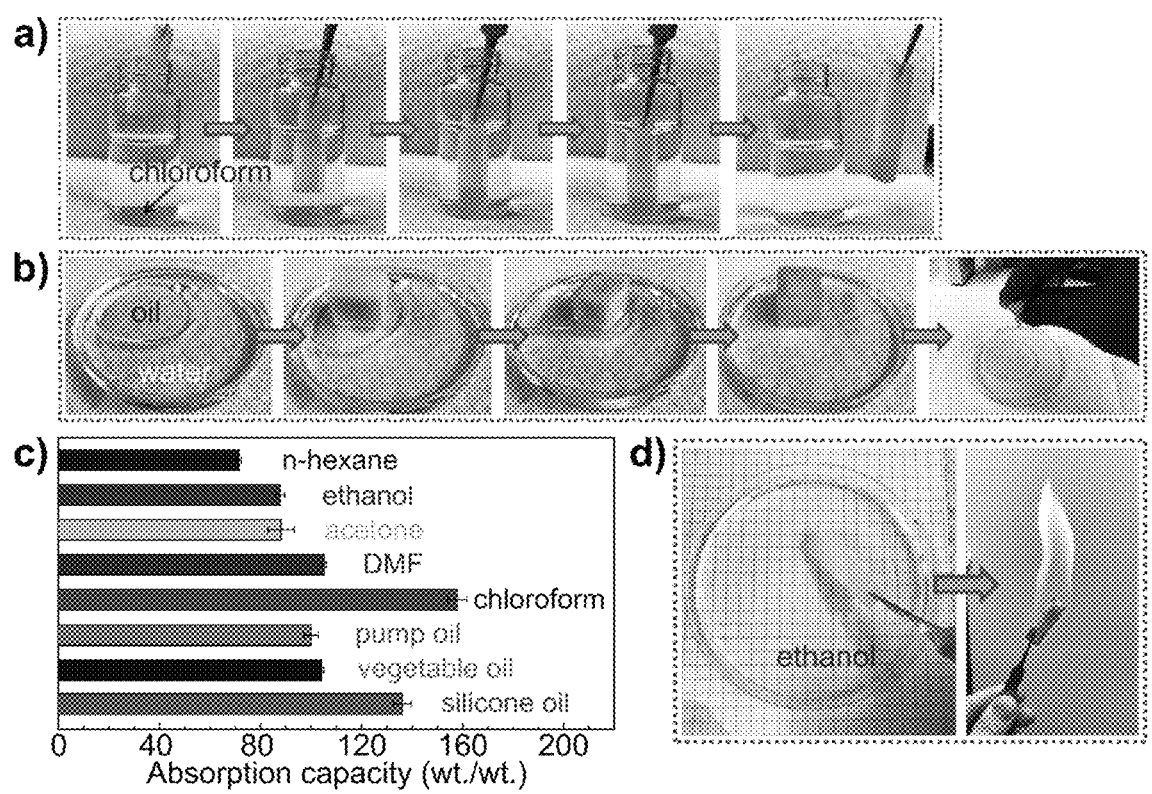
FIG. 18 shows a-b) photographs showing the absorption of (a) chloroform under water and (b) vegetable oil on water surface using the MII-HMS; c) absorption capacity of the MII-HMS treated with 0.1 M FeCl₃ solution for various organic solvents and oils; d) photographs showing the absorption and burning of ethanol using MII-HMS, showing the flame retardant property.

FIG. 18 shows that a piece of MII-HMS can extract a puddle of heavy oil such as chloroform underwater without uptake of water. For lighter oils such as vegetable oil, which floats on water surface, they can be readily removed by a cube of MII-HMS (FIG. 18, panel b); the absorbed oil can be then squeezed out from the cube. The absorption capacities of MII-HMS for various oils and organic solvents are evaluated. As shown in FIG. 18, panel c, MII-HMS exhibits excellent absorption capabilities of 71 times (for hexane) to 157 times (for chloroform) its own weight, where the absorption capability is decided by the density of the solvents/oils. Furthermore, the melamine sponge is flame retardant due to high nitrogen content,[5a] and MII-HMS maintains this property. As shown in FIG. 18, panel d, MII-HMS withstands the combustion of absorbed ethanol, and no heavy smoke is generated till the ethanol is burned out.

Besides the excellent oil absorption capability, the total material cost of preparation of MII-HMS is estimated to be only ~0.530 per 1 inch$^3$. Therefore, the method for preparation of hydrophobic melamine sponge reported here is simple, facile, and economical.

While this invention may be embodied in many different forms, the described scientific papers and other referenced materials mentioned herein are incorporated by reference in their entirety. Furthermore, the invention encompasses any possible combination of some or all of the various embodiments mentioned herein, described herein and/or incorporated herein. In addition, the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

What is claimed is:

1. A metal-ion induced hydrophobic melamine resin produced by a process, the process consisting of:
    contacting a hydrophilic melamine resin with a metal ion solution, wherein the contacting forms the metal-ion induced hydrophobic melamine resin;
    wherein the metal ion solution contains ions of Fe$^{2+}$, Fe$^{3+}$, Zn$^{2+}$, Ni$^{2+}$, Co$^{2+}$, or a mixture thereof, or the metal ion solution contains ionic surfactant containing ions of Fe, Cr, Mn, Co, Ni, Cu, Zn, or a mixture thereof, and has a concentration of from about 0.001 M to about 1.0 M of the metal ion; and wherein the metal-ion induced hydrophobic melamine resin has a water contact angle of from about 90° to about 160°.

2. The resin of claim 1, wherein the melamine resin comprises melamine formaldehyde polymer, melamine formaldehyde bisulfate copolymer, melamine-formaldehyde foam, or a combination thereof.

3. The resin of claim 2, wherein the melamine resin is crosslinked with an aldehyde polymer, an alkyd polymer, an epoxy polymer, an acrylic polymer, a polyester polymer, or a blend or combination thereof.

4. The resin of claim 1, wherein the metal ion solution is of a salt having a counter ion comprising a nitrate, sulfate, phosphate, carbonate, chloride, bromide, iodide, or a combination thereof.

5. The resin of claim 4, wherein the metal ion solution is of $FeCl_2$, $FeCl_3$, $Fe(NO_3)_3$, $Zn(NO_3)_2$, $Co(NO_3)_2$, $Ni(NO_3)_2$, or a mixture thereof.

6. The resin of claim 5, wherein the metal ion solution has a concentration of from about 0.0005 M to about 0.5 M of the metal ion.

7. The resin of claim 1, wherein the contacting lasts from about 3 seconds to about 60 minutes.

8. The resin of claim 7, wherein the process further comprises drying the metal-ion induced hydrophobic melamine resin at a temperature from about 10° C. to about 110° C.

9. The resin of claim 8, wherein the metal-ion induced hydrophobic melamine resin has a water contact angle of from about 100° to about 130°.

10. A method of producing a metal-ion induced hydrophobic melamine resin consisting of:
    contacting a hydrophilic melamine resin with a metal ion solution, wherein the contacting forms a metal-ion induced hydrophobic melamine resin; and
    drying the metal-ion induced hydrophobic melamine resin at a temperature from about 10° C. to about 110° C.;
    wherein the metal ion solution contains ions of $Fe^{2+}$, $Fe^{3+}$, $Zn^{2+}$, $Ni^{2+}$, $Co^{2+}$, or a mixture thereof, or the metal ion solution contains ionic surfactant containing ions of Fe, Cr, Mn, Co, Ni, Cu, Zn, or a mixture thereof; and
    wherein the contacting lasts from about 3 seconds to about 60 minutes.

11. The method of claim 10, wherein the melamine resin comprises melamine formaldehyde polymer, melamine formaldehyde bisulfate copolymer, melamine-formaldehyde foam, or a combination thereof.

12. The method of claim 11, wherein the melamine resin is crosslinked with an aldehyde polymer, an alkyd polymer, an epoxy polymer, an acrylic polymer, a polyester polymer, or a blend or combination thereof.

13. The method of claim 10, wherein the metal ion solution is of a salt having a counter ion comprising a nitrate, sulfate, phosphate, carbonate, chloride, bromide, iodide, or a combination thereof.

14. The method of claim 13, wherein the metal ion solution is of $FeCl_2$, $FeCl_3$, $Fe(NO_3)_3$, $Zn(NO_3)_2$, $Co(NO_3)_2$, $Ni(NO_3)_2$, or a mixture thereof.

15. The method of claim 14, wherein the metal ion solution has a concentration of from about 0.001 M to about 1.0 M of the metal ion.

16. The method of claim 10, wherein the drying is at a temperature of from about 20° C. to about 100° C.

17. The method of claim 16, wherein the contacting lasts from about 5 seconds to about 2 minutes.

18. The method of claim 17 wherein the metal-ion induced hydrophobic melamine resin removes harmful oils, organic chemicals, or other pollutants for spill recover, decontamination, or cleaning purposes.

* * * * *